(12) United States Patent
Ashworth et al.

(10) Patent No.: US 12,137,283 B2
(45) Date of Patent: Nov. 5, 2024

(54) VIDEO SURVEILLANCE DEVICE

(71) Applicant: Special Services Group, LLC, Denair, CA (US)

(72) Inventors: Andrew J. Ashworth, Vancouver, WA (US); Elizabeth A. Goblirsch, Moss Landing, CA (US)

(73) Assignee: Special Services Group, LLC, Marina, CA (US)

( * ) Notice: Subject to any disclaimer, the term of this patent is extended or adjusted under 35 U.S.C. 154(b) by 134 days.

(21) Appl. No.: 18/068,111

(22) Filed: Dec. 19, 2022

(65) Prior Publication Data

US 2023/0199285 A1 Jun. 22, 2023

Related U.S. Application Data

(60) Provisional application No. 63/265,741, filed on Dec. 20, 2021.

(51) Int. Cl.
*H04N 23/51* (2023.01)
*H04N 23/54* (2023.01)

(52) U.S. Cl.
CPC ............. *H04N 23/51* (2023.01); *H04N 23/54* (2023.01)

(58) Field of Classification Search
CPC ......... H04N 23/51; H04N 23/54; H04N 7/183
See application file for complete search history.

(56) References Cited

U.S. PATENT DOCUMENTS

| | | | |
|---|---|---|---|
| 2009/0189981 A1* | 7/2009 | Siann | H04N 23/00 348/143 |
| 2017/0150023 A1* | 5/2017 | Kim | G02B 7/09 |
| 2017/0295356 A1* | 10/2017 | Abbas | H04N 13/243 |

* cited by examiner

*Primary Examiner* — Gevell V Selby
(74) *Attorney, Agent, or Firm* — McHale & Slavin, P.A.

(57) ABSTRACT

A compact video surveillance device consisting of a 30× zoom camera with internal recorder, cellular modem, and a video compressor in a compact size that can be easily concealed; the device having a length of 96.9 mm, a height of 74.24 mm, and a width of 51.2 mm. Live video transfer is at bit rates as low as 10 kbps by the video compressor for transfer by the modem across 3G/4G/LTE networks.

6 Claims, 6 Drawing Sheets

VIDEO SURVEILLANCE DEVICE

PRIORITY CLAIM

In accordance with 37 C.F.R. 1.76, a claim of priority is included in an Application Data Sheet filed concurrently herewith. Accordingly, the present invention claims a priority date based upon U.S. Provisional Patent Application No. 63/265,741, entitled "Video Surveillance System", filed on Dec. 20, 2021. The above application is incorporated herein by reference in its entirety.

FIELD OF THE INVENTION

This invention is directed to the field of video surveillance systems and in particular to a compact video surveillance device.

BACKGROUND OF THE INVENTION

Video surveillance systems are known in the industry. Known video surveillance systems use one or more fixed length camera lenses requiring multiple windows. Fixed length camera lenses limit the quality of the image based upon the distance an object or individual is removed from the camera. Still other known devices lack a video compressor or recorder onboard, making them inefficient for law enforcement surveillance operations.

Technology is available by tethering together multiple products from different manufacturers to form a system consisting of a camera, recorder, video compressor, and modem which are networked using power cables. Such systems are difficult to operate, significantly larger in size, and impossible to fit into most small concealments.

What is lacking in the art is a compact video surveillance device that allows live video transfer without complex devices tethered to the device.

SUMMARY OF THE INVENTION

The video surveillance device of the instant invention is a single, compact unit consisting of a 30x zoom camera with internal recorder, cellular modem, and a video compressor. Unique to the invention device is the extremely small form factor that allows for covert law enforcement deployments in concealments with strict size limitations.

An objective of the invention is to provide a compact video surveillance device having dimensions of a length of 106.9 mm, a height of 74.24 mm, and a width of 51.2 mm using a video compressor with a modem and recorder that allows for live video to be transferred across the 3G/4G/LTE and the like cellular network at bit rates down to as low as 10 kbps.

Still another objective of the invention is to provide a compact video surveillance device having a camera with 30x zoom capability.

Yet still another objective of the invention is to provide a compact surveillance device having an internal recorder to allow for long term video storage.

Another objective of the invention is to provide streaming video that can be viewed live through a decompression server on video walls, PC's, and handheld mobile devices.

Yet still another objective of the invention is to provide a compact video surveillance device having a video compressor formed integral to a camera to provide an adjustable, low bandwidth, high-quality video feed over cellular networks.

Still another objective of the invention is to provide one portable device that can be quickly powered on and off and moved from one location or concealment to another with ease.

Other objectives and further advantages and benefits associated with this invention will be apparent to those skilled in the art from the description, examples and claims which follow.

DESCRIPTION OF THE PREFERRED EMBODIMENT

An embodiment of the instant invention is disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
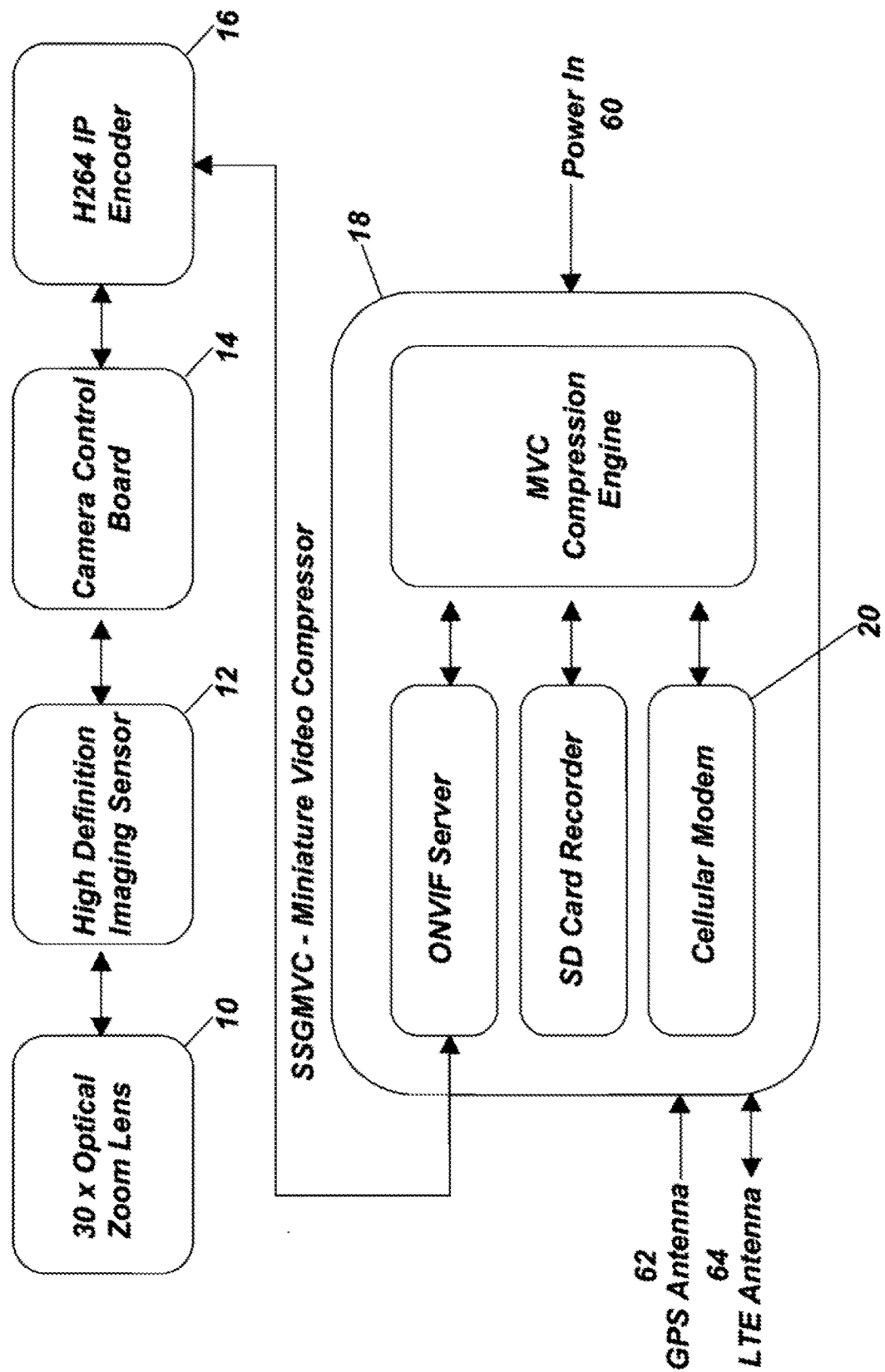
FIG. 1 is a block diagram of the video surveillance device of the instant invention.

The camera offers 30x zoom capability, the video compressor with modem allows for live video to be transferred across the 3G/4G/LTE (Long-Term Evolution) and the like cellular network at bit rates down to as low as 10 kbps, and the internal recorder allows for long term video storage. Referring to FIG. 1, illustrated is a functional block diagram of the invention depicting a 30x optical zoom lens camera 10, high definition imaging sensor 12, and a camera control board 14. The camera control board 14 produces a non-standard video output in the form of low voltage differential signaling (LVDS). An H264 IP (Internet Protocol) encoder 16 takes this signal and encodes it to an industry standard H264 video compression, presenting its output as H264 over RTSP (Real-Time Streaming Protocol). This RTSP stream is ingested by a SSGMVC (Special Services Group Miniature Video Compressor) miniature video compressor 18. For compactness, the SSGMVC miniature video compressor 18 is used as a board set, without its usual metalwork. The RTSP stream is further compressed by the SSGMVC to a rate low enough to be passed economically over cellular connections via its internal modem 20. In addition to the compression function, the SSGMVC also provides internal video recording (up to 1 TB), and hosts a GPS receiver.

Figure 2:
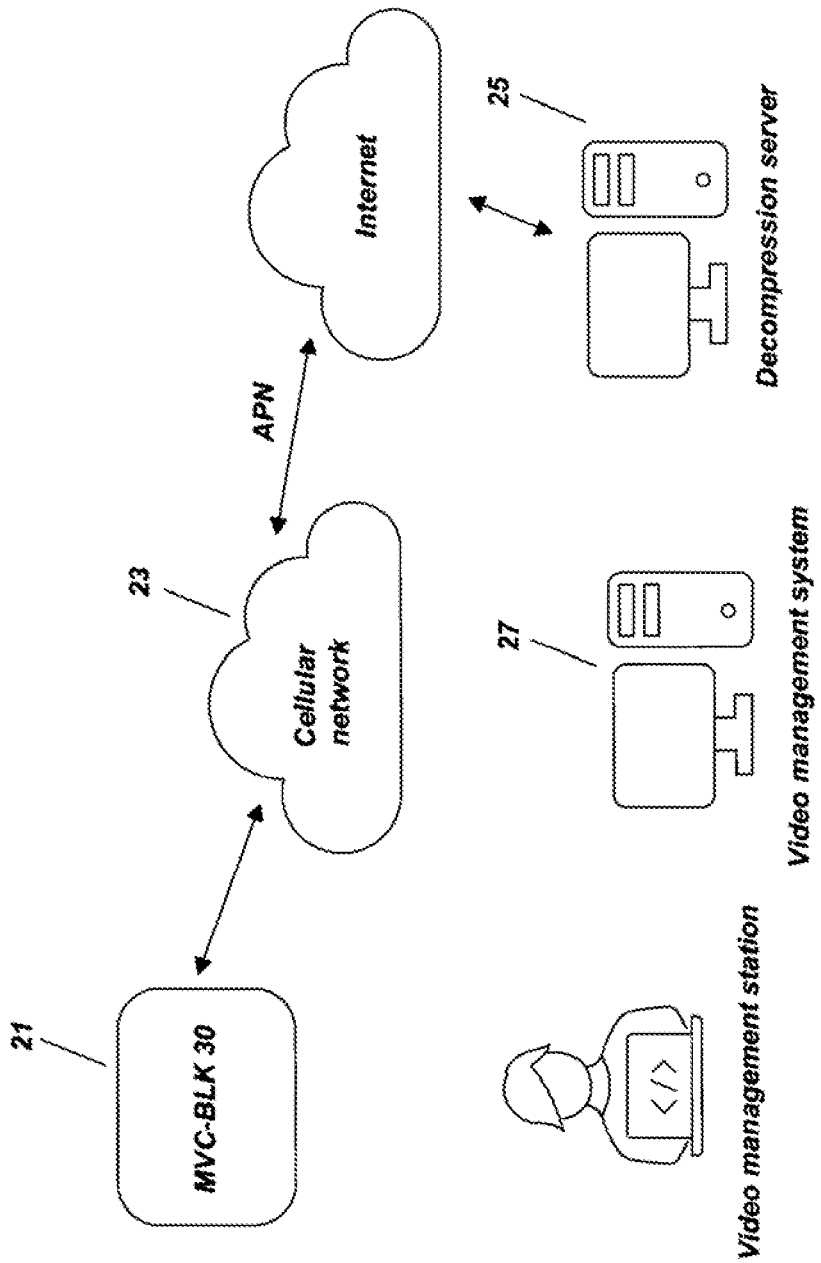
FIG. 2 is a block diagram of a cellular network and decompression server coupled to a customer's video management system (VMS).
Figure 6:
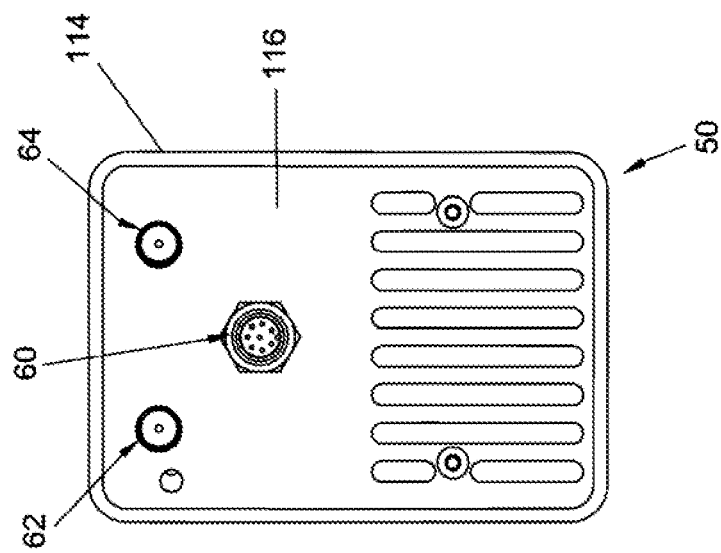
FIG. 6 is a plane rear view.
Figure 3:
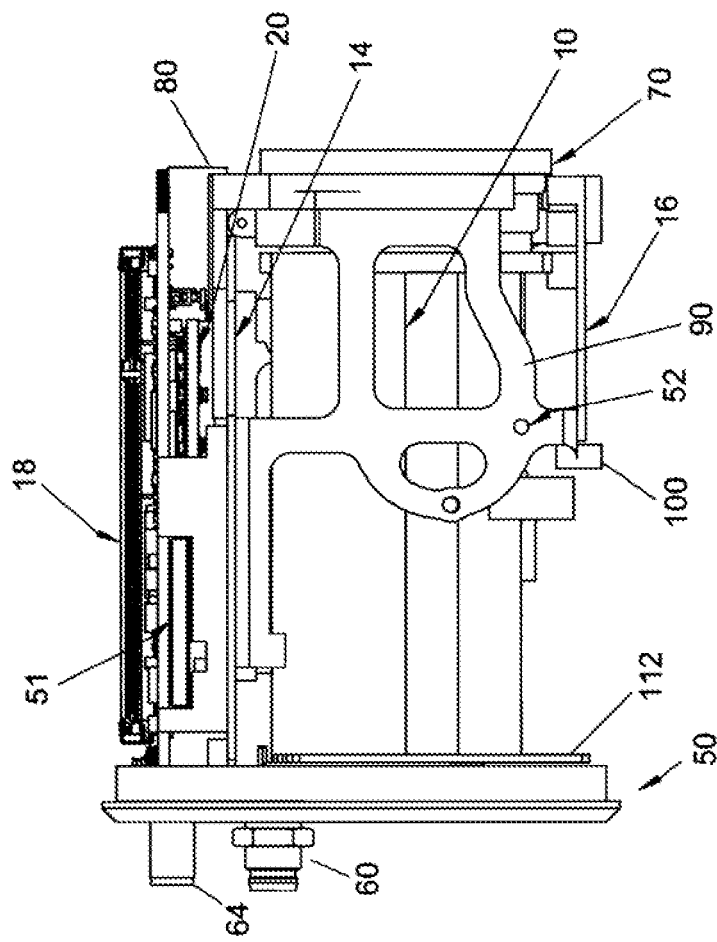
FIG. 3 is a left side view of the video surveillance device with the housing removed illustrating electronic component placement.
Figure 4:
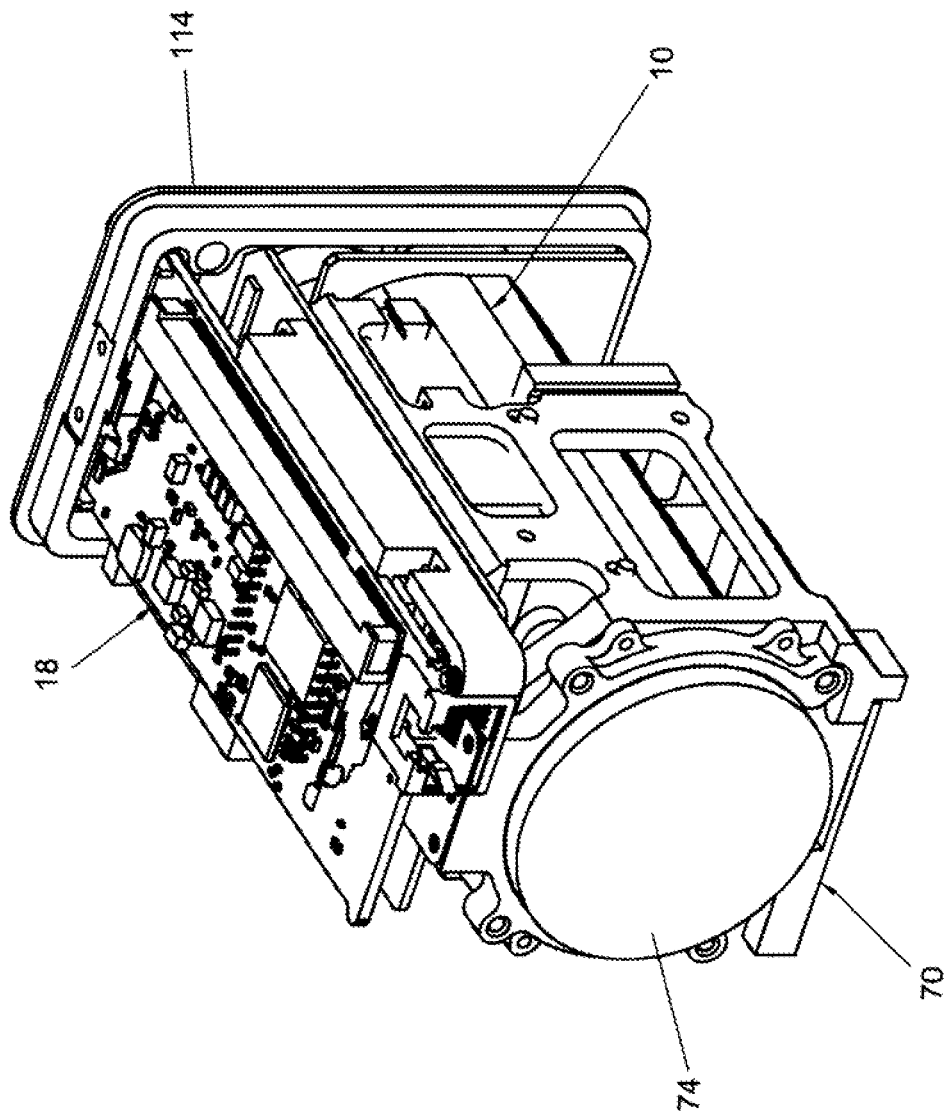
FIG. 4 is a front right perspective view.
Figure 5:
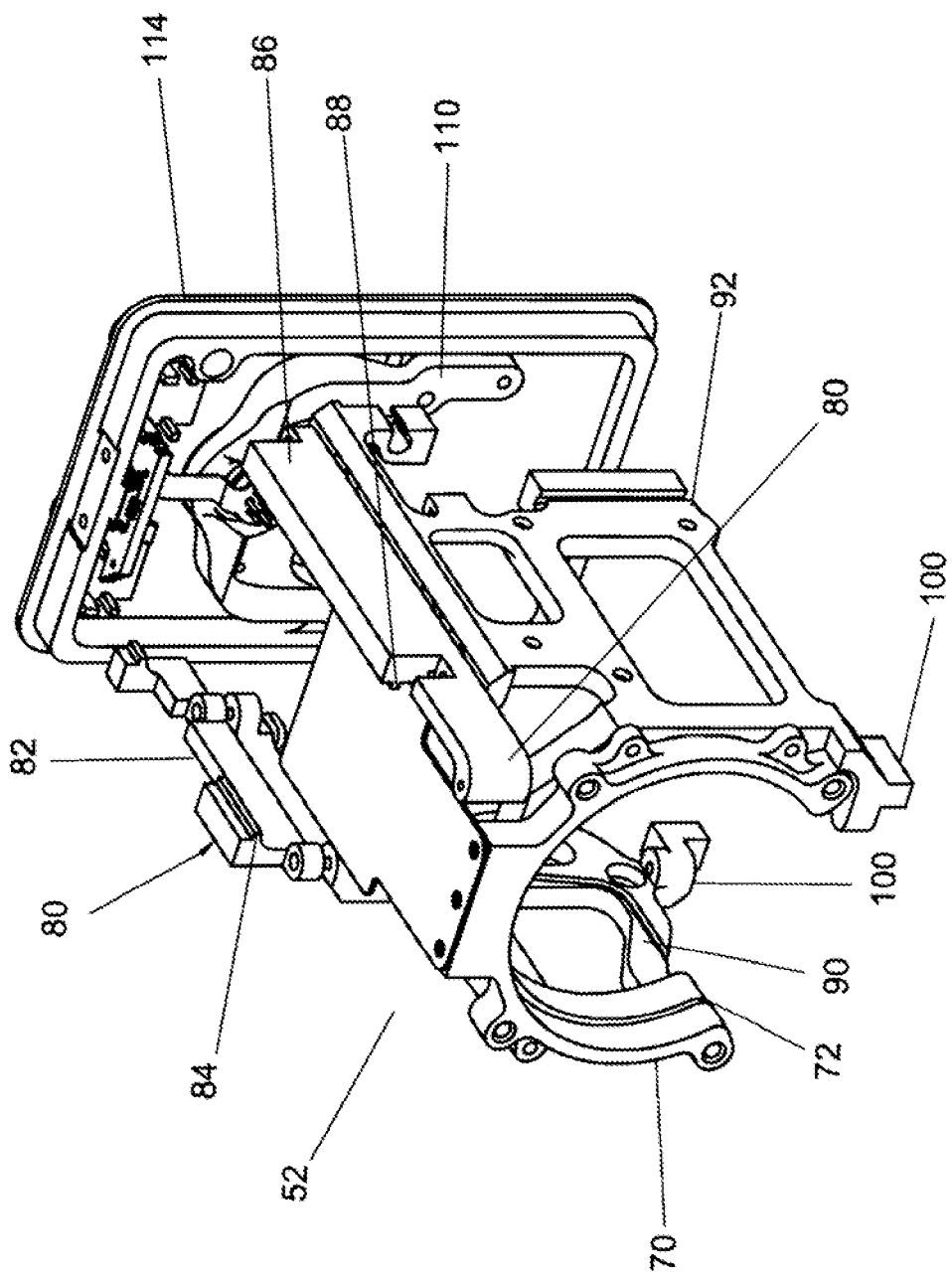
FIG. 5 is a front right perspective view of the frame with electronic components removed.
Figure 8:
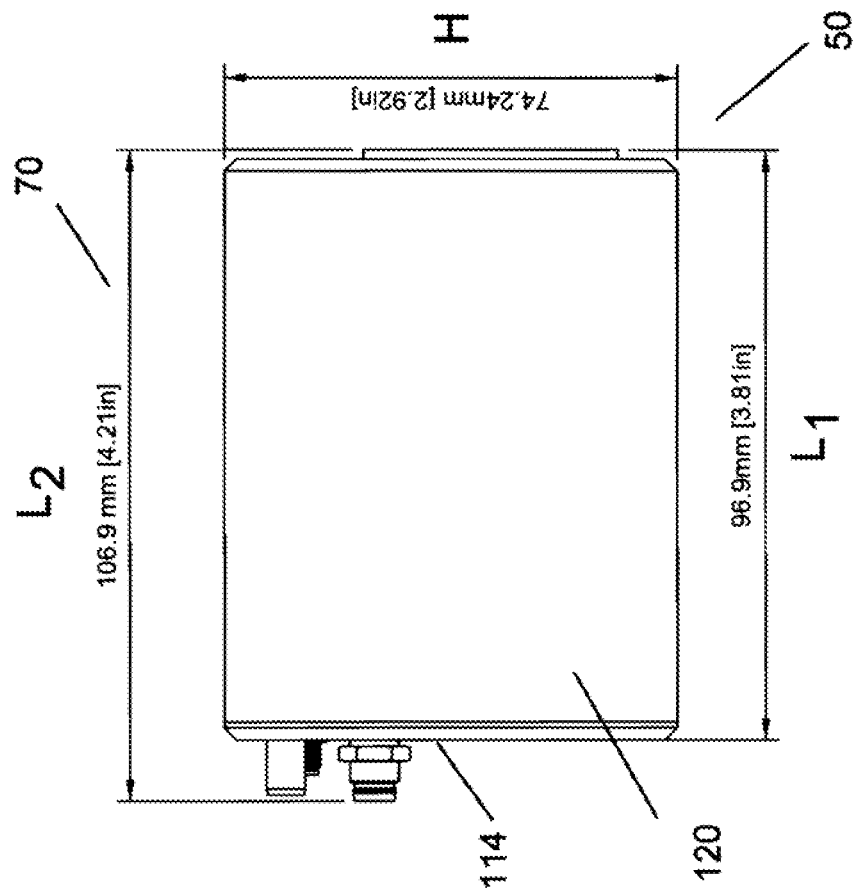
FIG. 8 is a plane side view with the cover installed.
Figure 7:
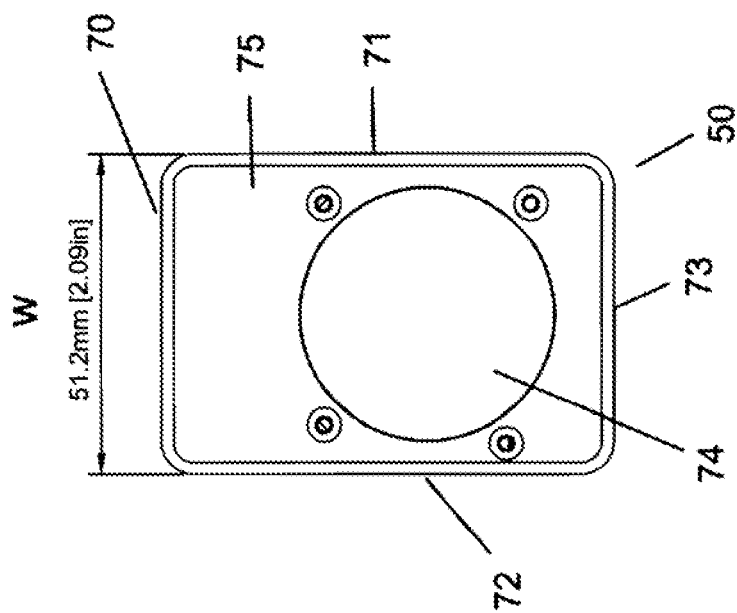
FIG. 7 is a plane front view.

Referring to the block diagram in FIG. 2, the compressed video 21 is sent over the cellular network 23 to a decompression server 25 at the customer's location. This server decompresses the video back to H264 and provides it as an ONVIF stream to the customer's video management system (VMS) 27. One of the functions of a VMS is to provide a control interface for the remote camera. In the instant invention, the zoom function of a lens is fully controllable. When the user generates a zoom command at the VMS station, the command is transferred back through the chain to the camera. Initially, the command is received by the decompression server; this passes the command to the selected SSGMVC via the cellular link. The SSGMVC extracts this command from the ONVIF stream and addresses it directly to the processor on the H264 IP encoder. This device then translates the command to RS232 and passes it to the camera control board, which directly actuates the lens. The device seamlessly couples to a cellular network, such as Verizon, AT&T, T-Mobile, Bell & Telus, External, via 3G/4G/5G/LTE or the like cellular network to VMS systems, such as a Milestone, Genetec and the like using low bandwidth rates with low latency.

The miniature video compressor provides a high quality video feed over the limited bandwidth cellular network. The compressor makes a connection to the decompression server located on the internet. An associated internet server webpage can be configured to compress the video at a specific level to suit the video quality requirements and cellular service. From the decompression server, the video is delivered to the VMS system.

Referring to FIGS. 3-6, the video surveillance device 50 comprises a frame 52 supporting the 30× optical zoom lens camera 10 coupled to the camera control board 14 for producing the differential signaling (LVDS). An H264 IP encoder 16 takes this signal and encodes for a SSGMVC miniature video compressor 18. The data stream is compressed by the SSGMVC to a rate low enough to be passed to cellular connections through an internal modem 20. An SD card 51 recording medium allows for video storage. Connections to the device 50 include a power connector port 60, a GPS antenna port 62, and an LTE antenna port 64.

The video surveillance device 50 employs the integrated frame 52 consisting of a front end wall 70 having a substantially circular shaped frame 72 configured to receive the lens 74 of the camera 10; the lens 74 having a 30× zoom capability. A top section 80 is coupled to the front end wall 70 with a first side wall 82 having a cradle snap 84, and a second side wall 86 including a reciprocal cradle snap 88 for receipt of the SSGMVC video compressor and a video recorder. In the preferred embodiment the recorder is an SD card medium 51. Opposing side walls 90, 92 are secured to the front end wall 70 and depend from the top section 80. The side walls 90, 92 secure the camera 10 and, through nesting of components, form a very small footprint.

The LTE modem 20 and camera control board 14 are nested beneath the SSGMVC compressor 18. A bottom section 100 is coupled to the opposing side edges 90, 92, which is constructed and arranged to receive an H264 IP encoder 16. An end wall 110 is coupled to the top section 80, and the opposing side walls 90, 92 support a high definition imaging sensor 112. The end wall 110 includes an end cover 114 having an outer surface 116 to provide an external connection for a GPS antenna port 62, an LTE antenna port 64, and a power connector port 60. A frame cover 120 enclosing the frame 52 is releasably coupled to the end wall cover 114; the frame cover 120 having a width W not to exceed 51.2 mm, a length L1 not to exceed 96.9 mm and a height H not to exceed 74.24 mm defined by top panel 70, a first side panel 71, a second side panel 72, a bottom panel 73, and a front panel 75. The length L2 of the device with the extending plugs does not exceed 106.9 mm.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed. The term "about" means, in general, the stated value plus or minus 5%.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A video surveillance device comprising: an integrated frame consisting of a substantially circular shaped front end wall configured to receive a camera with a 30× zoom capability; a top section coupled to said front end wall forming a cradle for receipt of a video compressor and a video recorder; opposing side walls secured to said front end wall and depending from said top section, said side walls securing said camera and nesting of an LTE modem and camera control board; a bottom section coupled to said opposing side walls, said bottom section constructed and arranged to receive an H264 IP encoder; an end wall coupled to said top section and said opposing side wall supporting a high definition imaging sensor and providing a GPS antenna port, LTE antenna port, and a power connector port; and a frame cover enclosing said frame and coupled to said end wall, said frame cover having a width not to exceed 51.2 mm, a length not to exceed 96.9 mm, and a height not to exceed 74.24 mm.

2. The video surveillance device according to claim 1 wherein said video compressor and said LTE modem allow for live video to be transferred across a cellular network at bit rates down to as low as 10 kbps.

3. The video surveillance device according to claim 1 wherein said recorder is an SD card medium allowing for long term video storage.

4. The video surveillance device according to claim 1 wherein said camera control board produces a non-standard video output in the form of low voltage differential signaling (LVDS).

5. The video surveillance device according to claim 1 wherein said H264 IP encoder provides over RTSP that is compressed by said video compressor to a rate low enough to be passed over cellular connections using said modem.

6. The video surveillance device according to claim 1 wherein said video compressor provides internal video recording up to 1 TB and is coupled to said GPS receiver.

* * * * *